(No Model.)
A. S. HICKLEY.
SECONDARY BATTERY.
No. 307,463. Patented Nov. 4, 1884.
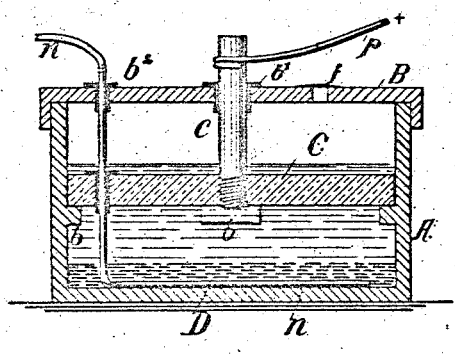
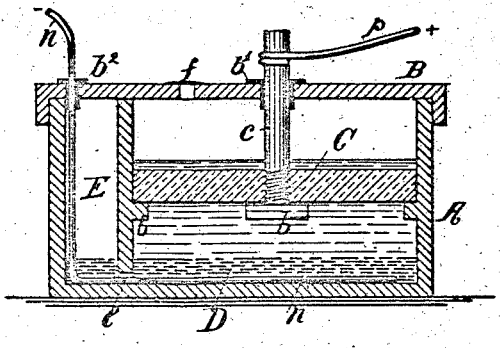
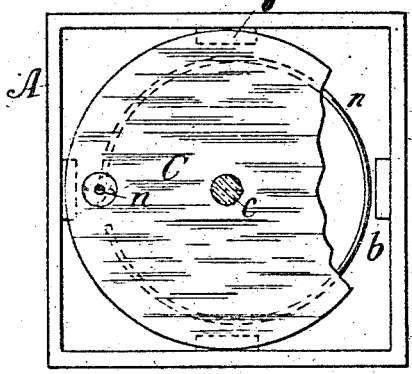
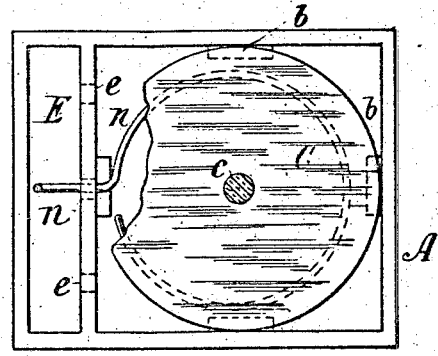
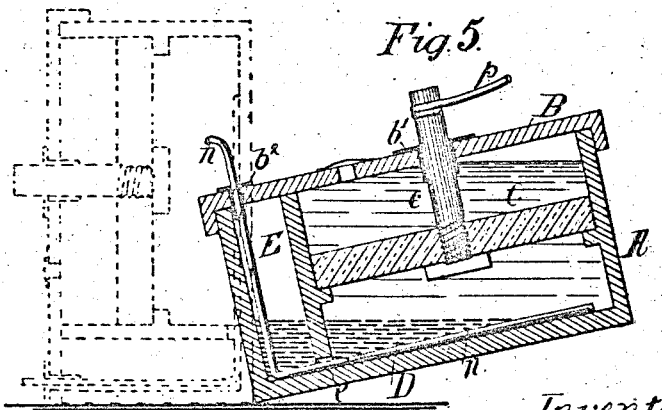
Witnesses
Inventor.
Arthur S. Hickley
Per R. A. Kellond
Atty.

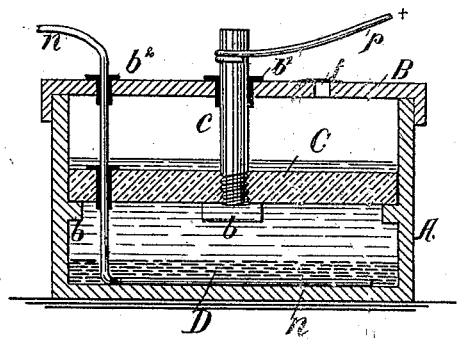
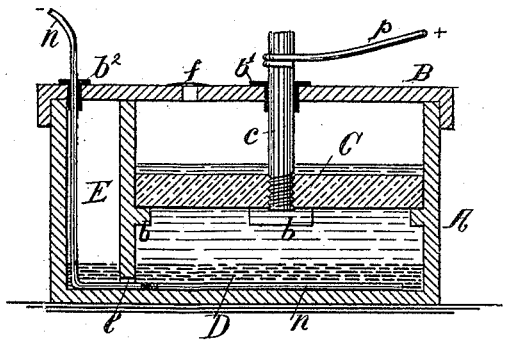
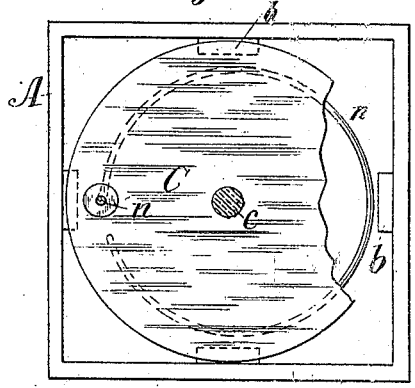
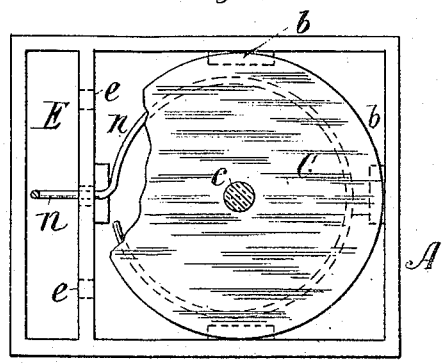
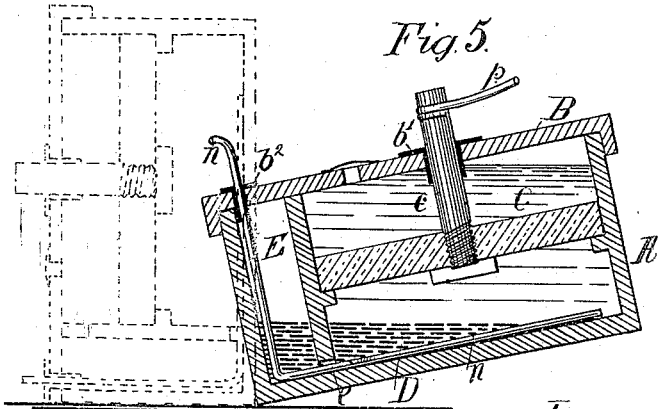

UNITED STATES PATENT OFFICE.

ARTHUR S. HICKLEY, OF MONTREAL, QUEBEC, CANADA, ASSIGNOR, BY MESNE ASSIGNMENTS, TO THE ELECTRIC AMALGAM COMPANY OF MAINE.

SECONDARY BATTERY.

SPECIFICATION forming part of Letters Patent No. 307,463, dated November 4, 1884.

Application filed November 2, 1883. (No model.)

*To all whom it may concern:*

Be it known that I, ARTHUR SAMUEL HICKLEY, of the city of Montreal, in the district of Montreal, and Province of Quebec, Dominion of Canada, have invented certain new and useful Improvements in Secondary Batteries; and I do hereby declare that the following is a full, clear, and exact description of the same.

This invention relates to an improved secondary battery which shall possess the following advantages over other means for storing electricity—viz., cheapness in first cost, reduction of size and weight of cells, greater simplicity of construction, and increased power of current.

It consists of a cathode of mercury, an anode of carbon or other suitable material possessing strong conductive properties, and an electrolyte composed of chloride of sodium in solution, (or as a paste.)

For more complete comprehension of my said invention, reference must be had to the accompanying drawings, in which letters similar to those used in the following detailed description indicate like parts, and where—

Figure 1 is a vertical section of my battery in one of its simplest forms, and Fig. 2 a plan view of same with cover removed. Fig. 3 is a vertical section of my battery constructed with separate chamber for mercury, and Fig. 4 a plan view of same with cover removed. Fig. 5 is a sectional view showing battery-cell tilted and mercurial surface lessened in main chamber, the dotted lines showing position of battery ready for transportation and with action stopped.

Letter A represents the main battery cell or chamber, made of porcelain, glass, wood lined with a non-absorbent substance or other suitable material, $b\ b$ being projections arranged on the inner walls of said cell.

B is a cover made to fit the cell A, so as to be approximately air-tight.

Resting upon the projections $b\ b$ is a plate, C, of carbon, which plate acts as the anode of the battery. Into it is screwed a post, $c$, preferably of the same material as in the plate C, which post projects up through the cover B, (any suitable packing, $b'$, being provided,) and the positive wire $p$ is connected to the upper end of this post.

$n$ represents the negative wire, which is coiled or laid along the bottom of the cell and taken out through the cover B, a packed opening, $b^2$, being provided therefor.

D represents the cathode of the battery, which is of mercury of suitable depth, and covering the coiled wire $n$. The electrolytic fluid which I use is by preference chloride of sodium, or potassium (in solution or as a paste.)

As seen in Figs. 3, 4, and 5, I sometimes use a separate chamber, E, contiguous to the main cell A, and preferably made in one therewith, into which the mercury can be drained through openings $e\ e$, made at the bottom of the division-wall. The use of this separate chamber E is to permit of the mercury being separated from the electrolytic fluid either wholly or partially. When it is desired to carry the cell from place to place, the mercury will be drained into the chamber E by turning same on end, as seen in dotted lines, Fig. 5, thus preventing said mercury from splashing about the bottom of the cell. Furthermore, by slightly canting the cell, as seen in Fig. 5, the surface of the cathode exposed to the electrolyte is lessened by part of the mercury being turned into the chamber E, and the strength and capacity of the current and battery thus regulated. When the main cell is completely emptied of mercury, of course the action of the secondary battery ceases.

$f$ represents any suitable valve arranged in the cover B, through which the gases emanating from the decomposition of the water can pass off without admitting fresh air.

In charging my secondary battery, the current is sent from a dynamo or magneto electric machine or primary battery along the wire $p$ and down through the post $c$ and plate C, and as the electrolyte surrounds and covers the latter the chloride of sodium is decomposed, and sodium in metallic form precipitated into the mercury, thus forming an amalgam of sodium and mercury, which I have found to give superior results as a storage element for electric energy. Chlorine and hydrogen are the resultant gases liberated from the cathode and anode, respectively, and these pass off, as mentioned, through the valve $f$.

I am aware that there is no novelty, broadly speaking, in precipitating a metallic salt upon a copper plate by an electric current; but I believe that I am the first to discover the peculiar properties of sodium or potassium in this connection, and have used it in combination with mercury for the reason that I have found sodium to be a positive metal much superior to zinc and the other metals heretofore considered best adapted for the purpose on account of its ready assimilation with the oxygen in the elements of the battery, and the consequent production of a very high electro-motive force and energy and reduction of internal resistance.

In discharging, the sodium separates itself from the mercury and decomposes the water of the electrolyte, thus forming a salt of sodium, the current from the secondary battery being taken off through the wire $n$.

What I claim, and desire to secure by Letters Patent, is as follows:

In a secondary battery, the combination, with a suitable cell and line connections, of an anode of carbon, a cathode of mercury, and an electrolyte containing a solution of chloride of an alkaline metal, substantially as specified.

Signed at the city of Montreal this 24th day of October, 1883.

ARTHUR S. HICKLEY.

Witnesses:
R. A. KELLOND,
JAS. A. WRIGHT.